(No Model.) 2 Sheets—Sheet 1.

M. SWENSON.
COTTON BALE OPENING OR PICKING MACHINE.

No. 574,048. Patented Dec. 29, 1896.

Witnesses

Inventor
Magnus Swenson (No Model.) 2 Sheets—Sheet 2.

M. SWENSON.
COTTON BALE OPENING OR PICKING MACHINE.

No. 574,048. Patented Dec. 29, 1896.

Inventor
Magnus Swenson,
by Geo. W. Waldo.
Atty.

United States Patent Office.

MAGNUS SWENSON, OF CHICAGO, ILLINOIS, ASSIGNOR TO THE COTTON GINNERS COMPRESS COMPANY, OF JERSEY CITY, NEW JERSEY.

COTTON-BALE OPENING OR PICKING MACHINE.

SPECIFICATION forming part of Letters Patent No. 574,048, dated December 29, 1896.

Application filed March 2, 1896. Serial No. 581,510. (No model.)

*To all whom it may concern:*

Be it known that I, MAGNUS SWENSON, a citizen of the United States, and a resident of Chicago, in the county of Cook and State of Illinois, have invented a new and useful Machine for Opening or Picking Bales of Cotton, of which the following is a specification.

This invention relates to improvements in machinery for opening or picking bales of cotton to prepare the cotton for spinning, and relates particularly to improvements in machinery of this type adapted for so opening or picking cylindrical cotton-bales formed by winding a bat of cotton under pressure in successive convolutions upon a core roll or spindle. Incident to the method of forming bales of this type, to wit, from a continuous bat, and also to the great pressure to which said bat is subjected, it results that the cotton becomes matted or felted, rendering the opening or picking of bales of this type an operation which has heretofore been attended with difficulty. The object of the present invention is to provide an improved machine for so opening or picking cotton-bales of this type.

In the preferable form thereof now known to me a machine embodying my invention comprises a slotted bale-support, on which the bale rests during the opening or picking operation; a picker roll or cylinder mounted so as to rotate freely in stationary bearings beneath said bale-support, said roll or cylinder being provided with a plurality of picker-teeth and being so located that as said picker roll or cylinder revolves the free ends of the picker-teeth will pass through and extend above the bale-support; driven rolls mounted in stationary bearings and adapted to impart rotation to the bale, and movable rolls which are held yieldingly in contact with the bale and which operate, in combination with the stationary rolls, to maintain the bale being opened or picked in position upon the bale-support and within the range of operation of the picker roll or cylinder.

The invention also consists of the various other features, combinations of features, and details of construction hereinafter described, and then pointed out in the claims.

Figure 1:
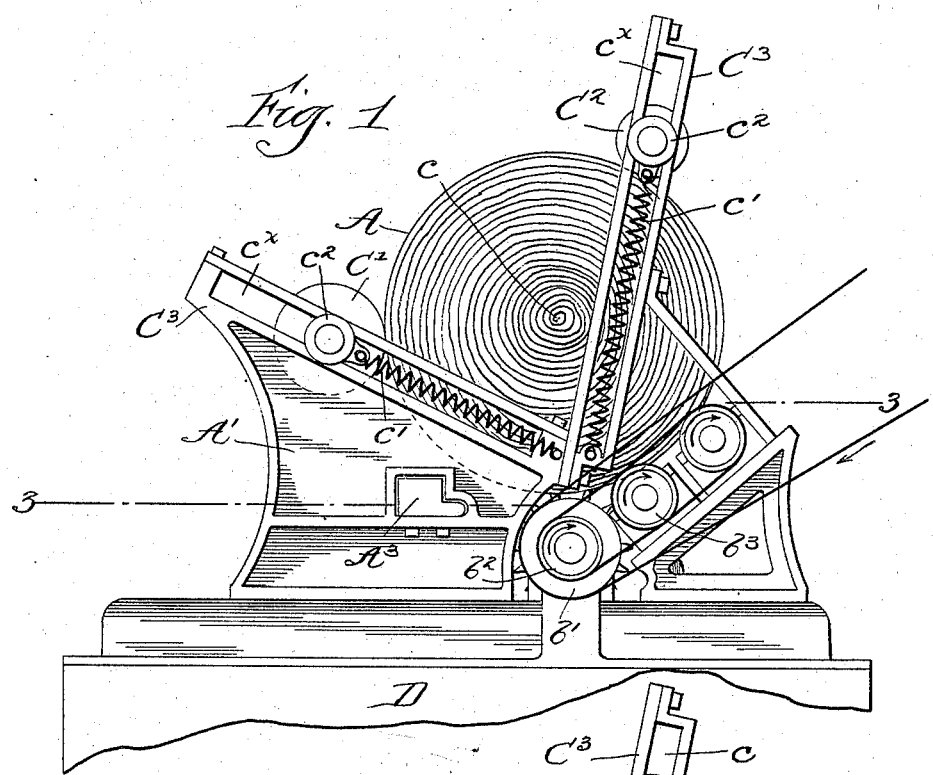
Figure 2:
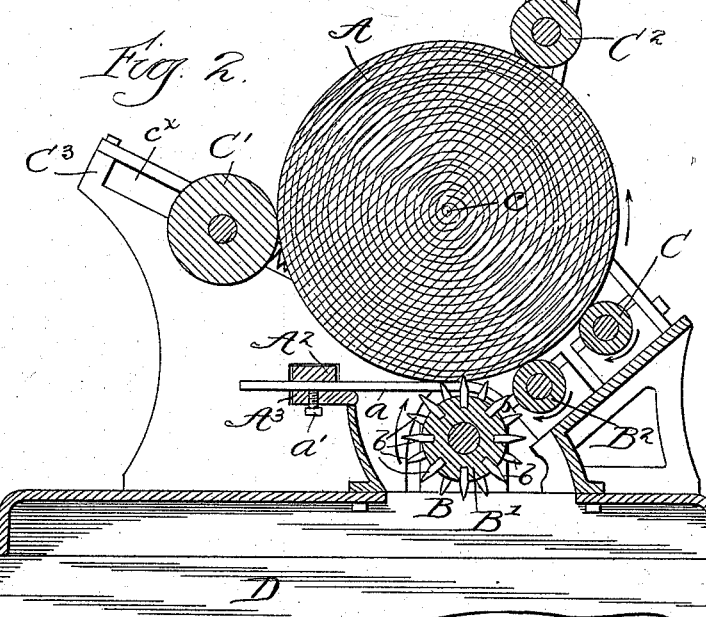
Figure 3:
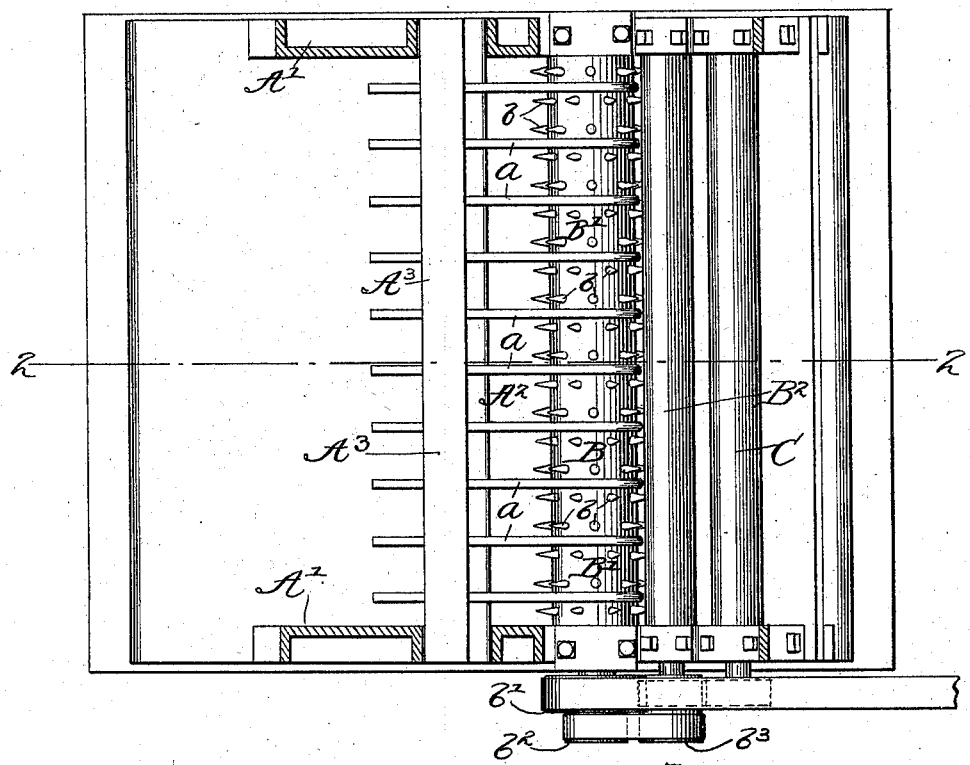
Figure 4:
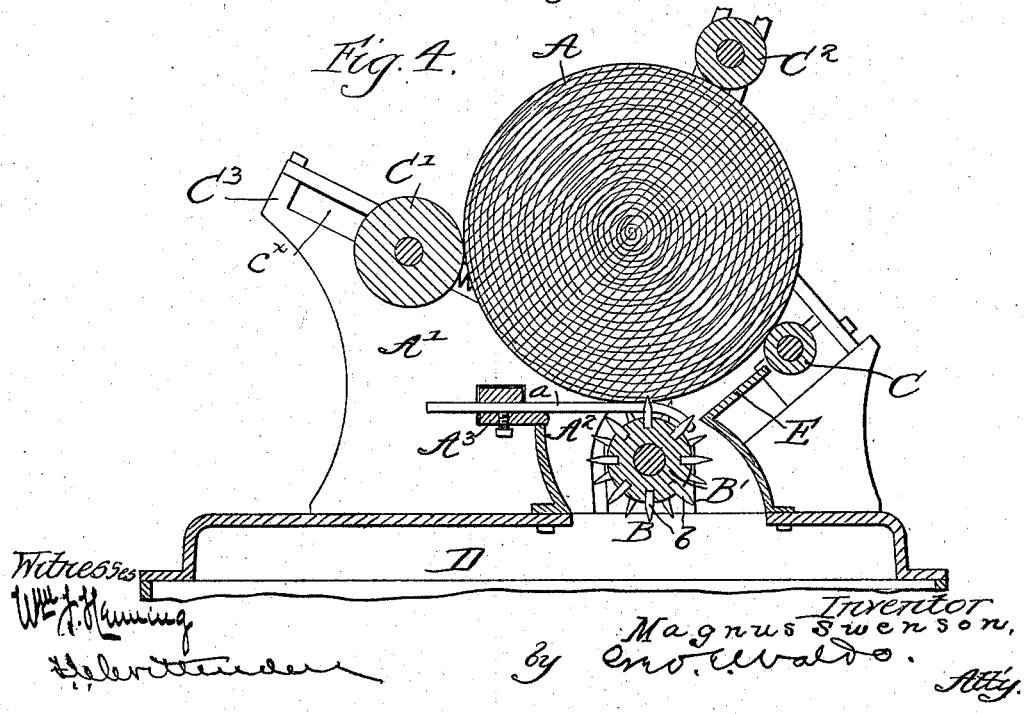

In the accompanying drawings a machine embodying my invention is fully illustrated. Figure 1 is a side view of a machine embodying my invention. Fig. 2 is a vertical sectional view thereof on the line 2 2 of Fig. 3. Fig. 3 is a plan section on the line 3 3 of Fig. 1; and Fig. 4 is a vertical sectional view, similar to Fig. 2, of a modified form of my machine.

Referring now to the drawings, A designates a cylindrical cotton-bale in position in the machine and being opened or picked thereby.

The frame of my improved bale opening or picking machine consists of rigidly-connected lateral frame plates or standards $A'$. Extending transversely between said frame plates or standards $A'$ is a slotted bale-support $A^2$, upon which the bale rests during the opening or picking operation. As shown, said bale-support $A^2$ consists of fingers $a$, rigidly secured at one end to a rigid transverse bar or support $A^3$, and the opposite ends of which are free. Preferably, also, said fingers $a$ are removably secured in holes formed in the bar or support $A^3$ by means of set-screws $a'$, as clearly shown.

Supported beneath the slotted bale-support $A^2$ in suitable bearings formed in the frame-plates $A'$ is a revoluble picker-roll B, which consists of a rigid cylinder $B'$, in which are secured a plurality of picker-teeth $b$. Said picker-teeth $b$ are pointed, and the position of said picker-roll B relatively to the slotted bale-support $A^2$ is such that as said picker-roll rotates the ends of said teeth $b$ pass through the slots in said bale-support and project above the same.

In the preferable construction shown the free ends of the fingers $a$ are curved or bent so as to pass in close proximity to the surface of the picker-roll B.

Mounted so as to rotate freely in suitable bearings formed in the frame-plates $A'$, in such position that the surface thereof will be closely adjacent to the free ends of the rods $a$, forming the table or platen $A^2$, and in such position, also, that the ends of the picker-teeth $b$ will pass close thereto, is a roll $B^2$. The roll $B^2$ thus forms a surface against which the picker-cylinder works, and which insures that any cotton which passes between said picker-cylinder and roll will be thoroughly picked or opened. For purpose of convenient reference said roll will be hereinafter designated as a "dead-roll" or "dead-knife."

Rotation in the direction indicated by the arrows is imparted to the picker-roll B and to the roll B² by any suitable means. As shown, the picker-roll B is driven from any suitable source of power by a belt adjusted to a pulley $b'$, secured to the shaft of said roll, and the roll B² is driven from the picker-roll B by means of a belt adjusted to pulleys $b^2$ $b^3$, secured to the shafts of the picker-roll B and of the roll B², respectively. To obtain the best results, the said picker-roll will be driven at a high speed, say, for example, fifteen hundred revolutions per minute, while the roll B² will be driven at a somewhat less rate of speed, say five hundred revolutions per minute.

In the preferable form of my improved machine means are provided, in combination with the picker-roll B, the bale-support A², and the roll B², to hold the bale upon which the machine is operating in contact with said bale-support A² and said roll B², in which position it will be within reach of the picker-teeth $b$. I will now describe in detail the preferable means shown for this purpose. Supported above and at one side of the roll B², in suitable bearings formed in the frame-plates A', is a roll C, the position of which is such that the surfaces of the table or platen A² of the roll B² and of the roll C will all be externally tangent to the same circle struck from $c$ as a center. The size of said circle will vary with the size of bale upon which said machine is designed to operate, but a usual size therefor will be about twenty-two inches in diameter.

Rotary movement is imparted to the roll C in the same direction and with the same surface speed as that imparted to the roll B², as shown, said roll C being driven from the shaft of the roll B² in the same manner as said roll B² is driven from the shaft of the picker-roll B. For convenience the rolls B² C are made of the same size.

Opposed to the bale-support A², the roll B², and the roll C are rolls C' C², the ends of the shaft of which respectively engage slots or guides $c^x$, formed in suitable brackets or standards C³. Means are also provided for holding said rolls C' C² yieldingly in contact with the bale A. As shown, coiled springs $c'$ are used for this purpose, each of said springs being secured to the frame of the machine or other rigid support at one end, and a loop or ring $c^2$, whereby said springs may be conveniently connected to the shafts of the rolls C' C², being formed on or attached to the other ends of said springs. Obviously by making said rolls C' C² sufficiently heavy they will operate by gravity to maintain the bale A in the desired position in the machine, and the springs $c'$ may then be dispensed with; but I prefer to use lighter rolls with springs applied thereto. The rolls C' C² are driven only from contact with the bale A.

The space beneath the bale-support A², in which the picker-roll B is mounted, will preferably be inclosed, and the under side of said roller projects into an inclosed chamber D, into which the picked or opened cotton is discharged, and whence it may be removed by means of a suction-fan in a familiar manner.

In addition to forming a dead-roll or dead-knife the roll B² obviously operates, in combination with the rolls C' C², to support the bale A in position and also to impart rotation to said bale.

In Fig. 4 of the drawings I have shown a modification of my improved machine. Said modified form of the machine is identical with the form thereof heretofore described, excepting that I substitute a plate E for the dead-roll B². The plate E, which may appropriately be termed a "dead-plate" or "dead-knife," is rigid and extends transversely of the machine and is so located that the ends of the picker-teeth $b$ pass in close proximity to the edge thereof. The position of said plate E is such, also, that the surface of the bale being opened or picked will not contact therewith until the bale is quite small and light. To facilitate the rotation of the bale when in contact therewith, the surface of said plate is very smooth and is highly polished.

I claim—

1. In a cotton-bale opening or picking machine, the combination of a bale-support, consisting of a series of rods or fingers, each of which is rigidly supported at one end and the other end of which is free, a picker-cylinder, mounted beneath said bale-supporting fingers, said picker-cylinder consisting of a solid hub or body portion and a plurality of picker-teeth secured therein, the ends of which project above the bale-supporting fingers as said picker-cylinder revolves, and a dead-knife located adjacent to the free ends of said bale-supporting fingers in such position that the ends of the picker-teeth pass in close proximity thereto, substantially as described.

2. In a cotton-bale opening or picking machine, the combination of a bale-support, consisting of a series of rods or fingers, each of which is rigidly supported at one end and the other end of which is free, a picker-cylinder mounted beneath said bale-supporting fingers, said picker-cylinder consisting of a solid hub or body portion and a plurality of picker-teeth secured therein, the ends of which project above the bale-supporting fingers, as said picker-cylinder revolves, the free ends of the bale-supporting fingers being bent or curved around the body portion of said picker-cylinder, and a dead-knife located adjacent to the free ends of said bale-supporting fingers, in such position that the ends of the picker-teeth will pass in close proximity thereto, substantially as described.

3. In a cotton-bale opening or picking machine, the combination of a bale-support, consisting of a series of rods or fingers, each of which is rigidly supported at one end and the other end of which is free, a picker-cylinder mounted beneath said bale-supporting fingers, said picker-cylinder consisting of a rigid hub or body portion and a plurality of picker-teeth secured therein, the ends of which project above the bale-supporting fingers as said picker-cylinder revolves, a roll located adjacent to the free ends of said bale-supporting fingers, in such position that the ends of the picker-teeth will pass close to the surface thereof, and means for rotating said roll in the same direction as the picker-cylinder is rotated, substantially as described.

4. In a cotton-bale opening or picking machine, the combination of a bale-support, consisting of a series of rods or fingers, rigidly supported at one end and the other ends of which are free, a picker-cylinder mounted beneath said bale-supporting fingers, said picker-cylinder consisting of a hub or body portion and a plurality of picker-teeth secured therein, the ends of which project above the bale-supporting fingers as said picker-cylinder revolves, the free ends of the bale-supporting fingers being bent or curved around the body portion of said picker-cylinder, a roll located adjacent to the free ends of said bale-supporting fingers in such position that the ends of the picker-teeth will pass close to the surface thereof and means for rotating said roll in the same direction as the picker-cylinder is rotated, substantially as described.

5. In a cotton-bale opening or picking machine, the combination of a bale-support, consisting of a series of rods or fingers, each of which is rigidly supported at one end and the other end of which is free, a picker-cylinder mounted beneath said bale-supporting fingers, said picker-cylinder consisting of a solid hub or body portion and a plurality of picker-teeth secured therein, the ends of which project above the bale-supporting fingers as said picker-cylinder revolves, a roll located adjacent to the free ends of said bale-supporting fingers, in such position that the ends of the picker-teeth will pass close to the surface thereof, means to rotate said roll and picker-cylinder in the same direction and means to maintain a bale in position upon the bale-supporting fingers, said means comprising a driven roll, mounted in stationary bearings, and a movable roll or rolls and means to hold said movable roll or rolls, yieldingly, in contact with the surface of a bale in said machine, substantially as described.

6. In a cotton-bale opening or picking machine, the combination of a bale-support, consisting of a series of rods or fingers, each of which is rigidly supported at one end and the other end of which is free, a picker-cylinder mounted beneath said bale-supporting fingers, said picker-cylinder consisting of a solid hub or body portion and a plurality of picker-teeth secured therein, the free ends of which project above the bale-supporting fingers, as said picker-cylinder revolves, a roll located adjacent to the free ends of said bale-supporting fingers, in such position that the ends of the picker-teeth will pass close to the surface thereof, means to rotate said roll and said picker-cylinder in the same direction, and means to maintain a bale in position upon the bale-supporting fingers, said means comprising a driven roll and a movable roll or rolls and springs applied to said movable roll or rolls and adapted to hold the same, yieldingly, in contact with the surface of the bale, substantially as described.

In testimony that I claim the foregoing as my invention I have hereunto set my hand this 24th day of February, 1896.

MAGNUS SWENSON.

Witnesses:
E. M. CARSON,
JAS. H. GIBSON.